(12) United States Patent
Osawa et al.

(10) Patent No.: US 12,156,281 B2
(45) Date of Patent: Nov. 26, 2024

(54) TERMINAL FOR ASSIGNING TRANSMISSION RESOURCE SCHEDULING PRIORITY

(71) Applicant: NTT DOCOMO, INC., Tokyo (JP)

(72) Inventors: Ryosuke Osawa, Tokyo (JP); Huan Wang, Beijing (CN); Xufei Zheng, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 30 days.

(21) Appl. No.: 17/265,702

(22) PCT Filed: Sep. 13, 2018

(86) PCT No.: PCT/JP2018/034082
§ 371 (c)(1),
(2) Date: Feb. 3, 2021

(87) PCT Pub. No.: WO2020/054042
PCT Pub. Date: Mar. 19, 2020

(65) Prior Publication Data
US 2021/0243586 A1 Aug. 5, 2021

(51) Int. Cl.
*H04W 84/18* (2009.01)
*H04W 8/00* (2009.01)
(Continued)

(52) U.S. Cl.
CPC ......... *H04W 8/005* (2013.01); *H04W 12/009* (2019.01); *H04W 28/021* (2013.01); *H04W 72/0446* (2013.01); *H04W 72/12* (2013.01); *H04W 74/0808* (2013.01); *H04W 74/0816* (2013.01); *H04W 84/18* (2013.01);
(Continued)

(58) Field of Classification Search
CPC . H04W 12/009; H04W 28/021; H04W 84/18; H04W 74/0808; H04W 72/1263; H04W 72/1242; H04W 56/0216; H04W 72/04; H04W 72/005; H04W 28/26; H04W 72/0486; H04B 17/382; H04L 47/76; H04L 47/24; H04L 1/0027; H04L 1/1854;
(Continued)

(56) References Cited

U.S. PATENT DOCUMENTS

2004/0002341 A1* 1/2004 Chen .................... H04W 72/543
455/500
2013/0065621 A1* 3/2013 Chang ................. H04W 72/542
455/500

(Continued)

OTHER PUBLICATIONS

R1-162734, "Resource pool for V2V", Apr. 11-15, 2016, pp. 1-4 (Year: 2016).*

(Continued)

*Primary Examiner* — Salvador E Rivas
(74) *Attorney, Agent, or Firm* — Osha Bergman Watanabe & Burton LLP

(57) ABSTRACT

A user equipment includes a receiving unit that executes sensing for a part of candidate resources to be used for transmission of inter-terminal direct communication, a control unit that determines a resource to be used for transmission based on a result of the sensing, and a transmitting unit that transmits a message to another units of user equipment using the determined resource.

6 Claims, 12 Drawing Sheets

(51) Int. Cl.
*H04W 12/00* (2021.01)
*H04W 28/02* (2009.01)
*H04W 72/0446* (2023.01)
*H04W 72/12* (2023.01)
*H04W 74/0808* (2024.01)
*H04W 74/0816* (2024.01)
*H04B 17/382* (2015.01)
*H04L 47/76* (2022.01)
*H04W 4/40* (2018.01)
*H04W 92/18* (2009.01)

(52) U.S. Cl.
CPC ............ *H04B 17/382* (2015.01); *H04L 47/76* (2013.01); *H04W 4/40* (2018.02); *H04W 92/18* (2013.01)

(58) Field of Classification Search
CPC ... H04L 1/1887; H04L 5/0035; H04L 47/821; H04L 67/141
See application file for complete search history.

(56) References Cited

U.S. PATENT DOCUMENTS

| | | | | |
|---|---|---|---|---|
| 2015/0215977 A1* | 7/2015 | Yamazaki | ............... | H04W 8/26 455/450 |
| 2016/0088543 A1* | 3/2016 | Guo | ........................ | H04W 4/70 370/329 |
| 2017/0127409 A1* | 5/2017 | Mishra | .................. | H04W 28/26 |
| 2017/0201461 A1* | 7/2017 | Cheng | .................. | H04W 72/56 |
| 2018/0020365 A1* | 1/2018 | Xiong | .................. | H04W 72/04 |
| 2018/0206260 A1* | 7/2018 | Khoryaev | ............. | H04W 72/56 |
| 2018/0302807 A1* | 10/2018 | Chen | .................. | H04W 72/1263 |
| 2018/0310297 A1* | 10/2018 | Martin | .................. | H04W 72/04 |
| 2018/0376493 A1* | 12/2018 | Li | ........................ | H04W 72/042 |
| 2019/0159223 A1* | 5/2019 | Park | ..................... | H04W 72/543 |
| 2020/0214002 A1* | 7/2020 | Lee | ....................... | H04W 72/02 |
| 2020/0305152 A1* | 9/2020 | Yasukawa | ............. | H04W 92/18 |
| 2020/0383088 A1* | 12/2020 | Min | .................. | H04W 72/0453 |
| 2021/0219314 A1* | 7/2021 | Osawa | .................. | H04W 76/14 |

OTHER PUBLICATIONS

3GPP TSG RAN WG1 Meeting #84bis; R1-162734 "Resource pool for V2V" Lenovo; Busan, Korea; Apr. 11-15, 2016 (4 pages).

3GPP TS 36.211 V15.2.0 "3rd Generation Partnership Project; Technical Specification Group Radio Access Network; Evolved Universal Terrestrial Radio Access (E-UTRA); Physical channels and modulation (Release 15)" (236 pages).

3GPP TR 22.886 V15.1.0 "3rd Generation Partnership Project; Technical Specification Group Services and System Aspects; Study on enhancement of 3GPP Support for 5G V2X Services (Release 15)" (58 pages).

International Search Report issued in International Application No. PCT/JP2018/034082, mailed Dec. 4, 2018 (4 pages).

Written Opinion issued in International Application No. PCT/JP2018/034082; Dated Dec. 4, 2018 (4 pages).

* cited by examiner

TERMINAL FOR ASSIGNING TRANSMISSION RESOURCE SCHEDULING PRIORITY

TECHNICAL FIELD

The present invention relates to a user equipment and a base station device in a wireless communication system.

BACKGROUND ART

In Long Term Evolution (LTE), successor systems of LTE (for example, LTE-Advanced (LTE-A), and New Radio (NR) (also called 5G)), device to device (D2D) technology in which units of user equipment perform communication directly with each other without going through a base station device is under review (for example, Non-Patent Document 1).

In D2D, it is possible to reduce traffic between a user equipment and a base station device, and communication between units of user equipment can be performed even when a base station device is unable to perform communication in the event of a disaster or the like. In 3rd Generation Partnership Project (3GPP), D2D is called "sidelink," but D2D which is a more general term is used in this specification. However, in the description of an embodiment to be described later, a sidelink is also used if necessary.

D2D communication is roughly classified into D2D discovery for discovering other equipments which are capable of performing communication and D2D communication (also referred to as D2D direct communication, D2D communication, or inter-terminal direct communication) in which direct communication between units of user equipment is performed. Hereinafter, when D2D communication, D2D discovery, and the like are not particularly distinguished, they are referred to simply as D2D. A signal transmitted and received by D2D is referred to as a D2D signal. In NR, various use cases of services related to vehicle to everything (V2X) are under review (for example, Non-Patent Document 2).

RELATED ART DOCUMENT

Non-Patent Document

Non-Patent Document 1: 3GPP TS 36.211 V15.2.0 (2018-06)
Non-Patent Document 2: 3GPP TR 22.886 V15.1.0 (2017-03)

SUMMARY OF THE INVENTION

Problem to be Solved by the Invention

When a case in which a resource to be used for D2D communication is scheduled to a user equipment by a base station device or the like and a case in which a user equipment autonomously selects a resource to be used for D2D communication coexist, influence of collision of resources is assumed to increase.

The present invention has been accomplished in view of the foregoing, and an object is to reduce collision of resources to be used by a user equipment in inter-terminal direct communication.

Means for Solving the Problem

According to the technology of the disclosure, provided is a user equipment including a receiving unit that executes sensing for a part of candidate resources to be used for transmission of inter-terminal direct communication, a control unit that determines a resource to be used for transmission based on a result of the sensing, and a transmitting unit that transmits a message to another user equipment using the determined resource.

Advantage of the Invention

According to the technology of the disclosure, it is possible to reduce collision of resources to be used by a user equipment in inter-terminal direct communication.

EMBODIMENTS OF THE INVENTION

Figure 1:
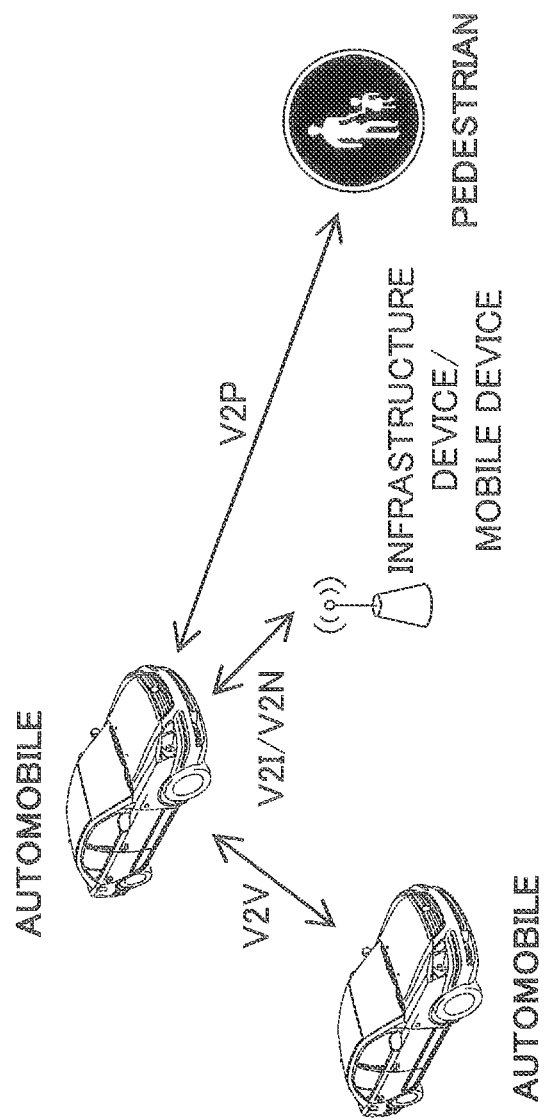
FIG. 1 is a diagram for illustrating V2X.

Hereinafter, an embodiment of the present invention will be described with reference to the appended drawings. Note that the following is an example, and embodiments to which the present invention is applied are not limited to the following embodiment.

In an operation of a wireless communication system of an embodiment of the present invention, existing technology is appropriately used. Here, the existing technology is, for example, existing LTE but not limited to existing LTE. Further, the term "LTE" used in this specification shall have a broad meaning including LTE-Advanced and a scheme subsequent to LTE-Advanced (for example, NR), or a wireless local area network (LAN) unless otherwise configured forth herein.

In an embodiment of the present invention, a duplex scheme may be a time division duplex (TDD) scheme, a frequency division duplex (FDD) scheme, or any other scheme (for example, a flexible duplex or the like).

In the following description, a method of transmitting a signal using a transmission beam may be digital beam forming of transmitting a signal (pre-coded with a pre-coding vector) multiplied by a pre-coding vector or may be analog beam forming for realizing beam forming using a variable phase shifter in a radio frequency (RF) circuit. Similarly, a method of receiving a signal using a reception beam may be digital beam forming of multiplying a received signal by a predetermined weight vector or may be analog beam forming of realizing beam forming using a variable phase shifter in a RF circuit. Hybrid beam forming in which digital beam forming and analog beam forming are combined may be applied to transmission and reception. Further, transmitting a signal using a transmission beam may be transmitting a signal through a specific antenna port. Similarly, receiving a signal using a reception beam may be receiving a signal through a particular antenna port. An "antenna port" refers to a logical antenna port or a physical antenna port defined in the 3GPP standard. In addition, a precoding or the beam forming is also referred to as a "pre-coder" or a "spatial domain filter."

A method of forming the transmission beam and the reception beam is not limited to the above method. For example, in the base station device 10 and the user equipment 20 having a plurality of antennas included in the wireless communication system of an embodiment of the present invention, a method of changing an angle of each antenna may be used, a method in which a method using a precoding vector and a method of changing an angle of an antenna are combined may be used, a method of switching and using different antenna panels may be used, a method of using a combination of a plurality of antenna panels may be used, or any other method may be used. Further, for example, a plurality of different transmission beams may be used in a high frequency band. Using a plurality of transmission beams is referred to as a multi-beam operation, and using a single transmission beam is used is referred to as a single beam operation.

Further, in an embodiment of the present invention, when a wireless parameter or the like is configured, it may mean that a predetermined value is "pre-configured" or it may mean that a wireless parameter notified from the base station device 10 or the user equipment 20 is configured.

FIG. 1 is a diagram for illustrating V2X. In 3GPP, implementing vehicle to everything (V2X) or enhanced V2X (eV2X) by extending a D2D function is under review, and specifications thereof are in progress. As illustrated in FIG. 1, V2X is a part of intelligent transport systems (ITS) and is a generic term of vehicle to vehicle (V2V) meaning a communication form performed between automobiles, vehicle to infrastructure (V2I) meaning a communication form performed between an automobile and a road-side unit (RSU) installed on a road side, vehicle to nomadic device (V2N) meaning a communication mode performed between an automobile and a mobile terminal carried by a driver, and vehicle to pedestrian (V2P) meaning a communication mode performed between an automobile and a mobile terminal carried by a pedestrian.

In 3GPP, V2X using cellular communication and inter-terminal communication of LTE or NR is being studied. For V2X of LTE or NR, review not limited to 3GPP specification is expected to be conducted from now. For example, cost reduction by securing of interoperability and implementing of an upper layer, a combining or switching method of a plurality of radio access technologies (RATs), regulation response in each country, and data acquisition, delivery, database management, and use method of V2X platform of LTE or NR are expected to be under review.

In an embodiment of the present invention, a form in which the communication device is installed on a vehicle is mainly assumed, but the embodiment of the present invention is not limited to this form. For example, the communication device may be a terminal carried by a person, the communication device may be a device installed in a drone or an aircraft, and the communication device may be a base station, an RSU, a relay station (relay node), a user equipment having a scheduling capability, or the like.

Note that sidelink (SL) may be distinguished from uplink (UL) or downlink (DL) based on one of the following 1) to 4) or a combination thereof. Further, SL may have any other name.

1) A resource arrangement in a time domain
2) A resource arrangement in a frequency domain
3) A synchronization signal to be referred to (including a sidelink synchronization signal (SLSS))
4) A reference signal used for path loss measurement for transmission power control Further, for orthogonal frequency division multiplexing (OFDM) of SL or UL, any one of cyclic-prefix OFDM (CP-OFDM), discrete Fourier transform-spread-OFDM (DFT-S-OFDM), non-transform pre-coded OFDM, and transform pre-coded OFDM may be applied.

In SL of LTE, Mode 3 and Mode 4 are specified for SL resource allocation to the user equipment 20. In Mode 3, transmission resources are dynamically allocated in accordance with downlink control information (DCI) transmitted from the base station device 10 to the user equipment 20. In Mode 3, semi persistent scheduling (SPS) can be performed as well. In Mode 4, the user equipment 20 autonomously selects transmission resources from a resource pool.

A slot in an embodiment of the present invention may be replaced with a mini slot, a sub frame, a radio frame, a transmission time interval (TTI), or the like.

Generally, there are three types of media access control (MAC) configurations of an ad hoc network such as V2X: distributed; semi-distributed; and centralized. In the centralized MAC, the base station device 10 performs a resource allocation as a coordinator/manager. For example, the LTE Sidelink transmission mode 3 or the like correspond to the centralized MAC. For example, a disadvantage of the centralized MAC lies in that it is unable to be operated outside the coverage. Further, the base station device 10 is affected when an overhead associated with a scheduling request (SR) and a buffer status report (BSR) becomes excessive. For example, when a large number of UE-equipped vehicles transmit the SR and the BSR, since a large overhead is predicted, it is necessary for a network to support a low delay SR procedure.

Figure 2:
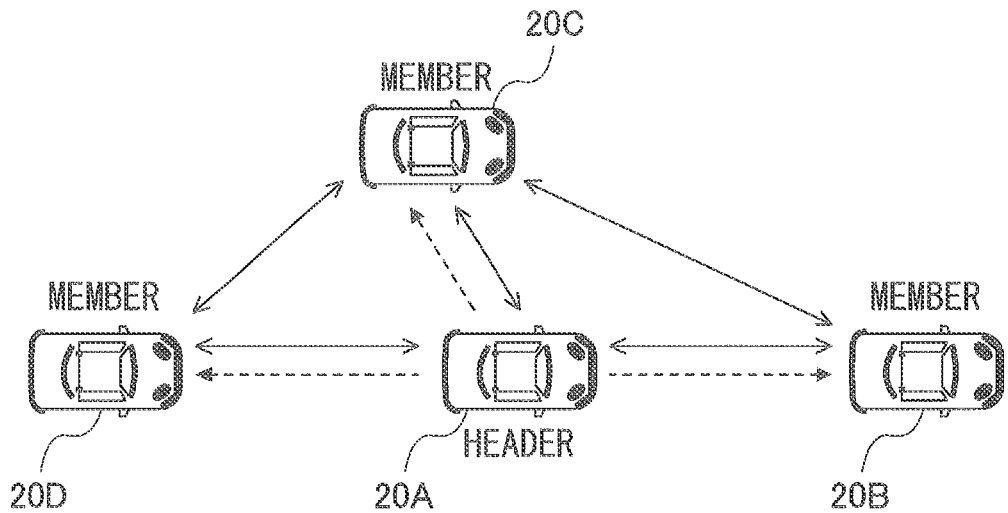
FIG. 2 is a diagram for illustrating an example (1) of a wireless communication system.

FIG. 2 is a diagram for illustrating an example (1) of a wireless communication system. A wireless communication system illustrated in FIG. 2 is a configuration example of a semi-distributed MAC, and a group is constituted at least by one user equipment 20 which is a header and one or more units of user equipment 20 which are members. In the example of FIG. 2, there is a UE group including four units of user equipment 20, that is, a user equipment 20A which is a header and a user equipment 20B, a user equipment 20C, and a user equipment 20D which are members. In the semi-distributed MAC, the user equipment 20A performs a resource allocation or scheduling as a coordinator/manager. In the semi-distributed MAC, a plurality of units of user equipment 20 are divided into UE groups each including one or more units of user equipment 20, and the user equipment 20 which is the header of the UE group executes an SL resource allocation or scheduling for the user equipment 20 which is a member. The scheduling of the semi-distributed MAC can solve the above-described disadvantages of the distributed MAC or the centralized MAC. The header refers to a user equipment 20 that allocates or schedules a resource to be used for the inter-terminal direct communication to other units of user equipment 20 within a resource set associated with the UE group in the UE group including a plurality of units of user equipment 20. The member refers to a user equipment 20 to which the resource to be used for the inter-terminal direct communication is allocated or scheduled from the user equipment 20 which is the header in the UE group including a plurality of units of user equipment 20.

Figure 3:
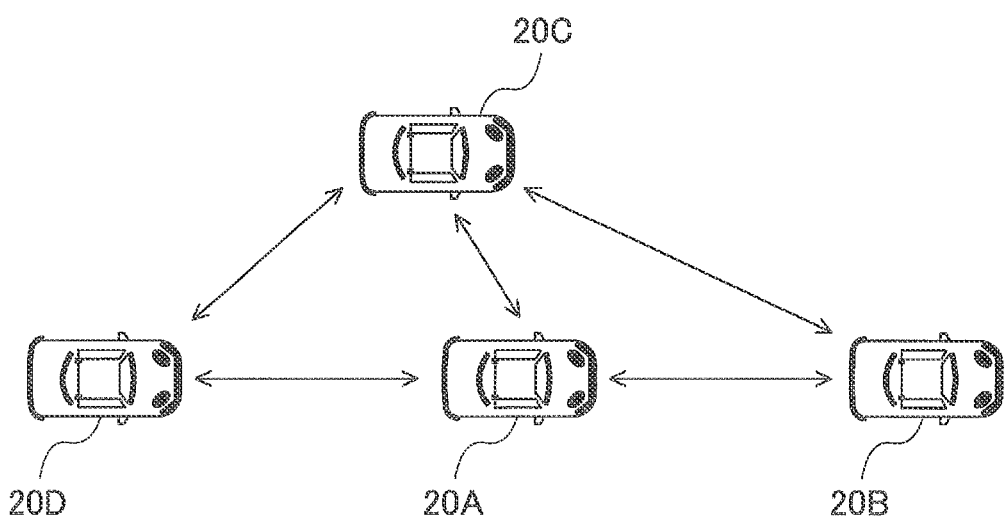
FIG. 3 is a diagram for illustrating an example (2) of a wireless communication system.

FIG. 3 is a diagram for illustrating an example (2) of a wireless communication system. The wireless communication system illustrated in FIG. 3 is a configuration example of the distributed MAC, and a group is configured by one or more units of user equipment 20 which are members. In the example of FIG. 2, there is a UE group including four units of user equipment 20, that is, a user equipment 20A, a user equipment 20B, a user equipment 20C, and a user equipment 20D. In the distributed MAC, there is no coordinator/manager that performs the resource allocation or scheduling. The user equipment 20 autonomously selects the SL resource which its own device uses for transmission. For example, 802.11p, the LTE Sidelink transmission mode 4 or the like correspond to distributed MAC. The disadvantages of the distributed MAC are as follows. In the mode 4, periodic traffic is assumed, and it is not suitable for aperiodic traffic. In 802.11p using carrier sense multiple access (CSMA), contention of resources frequently occurs, and requirements of high reliability are unable to be satisfied in a situation in which the number of terminals is large.

Figure 4:
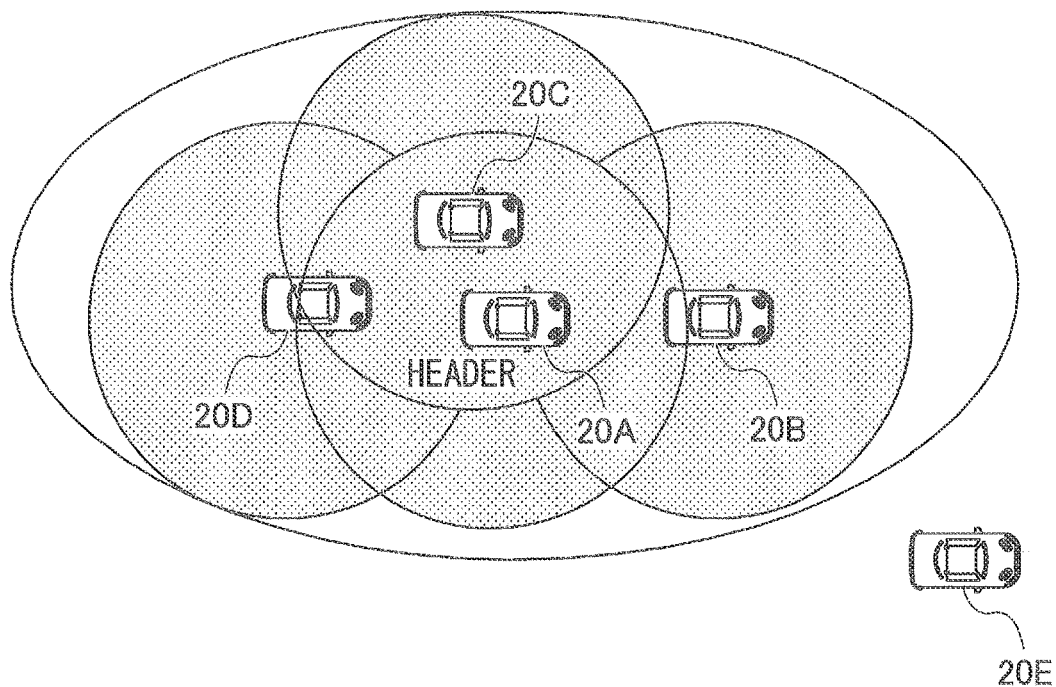
FIG. 4 is a diagram for illustrating an example (1) of an operation of a user equipment in an embodiment of the present invention.

FIG. 4 is a diagram for illustrating an example (1) of an operation of the user equipment in an embodiment of the present invention. A scheduling type MAC such as the centralized MAC or the semi-distributed MAC and an autonomous resource selection type MAC such as the distributed MAC can complement each other by taking each other's advantages. On the other hand, since different resource selection mechanisms are used, it is necessary to reduce a resource collision that occurs between the units of user equipment 20 using their respective MAC mechanisms. Further, it is necessary to properly specify conditions for determining a MAC mechanism to be used. Further, in the scheduling type MAC, the base station device 10 may perform scheduling, or the user equipment 20 may perform scheduling. Further, in the autonomous resource selection type MAC, the resource selection may be executed by any sensing.

In FIG. 4, the UE group includes a user equipment 20A which is a header and a user equipment 20B, a user equipment 20C, and a user equipment 20D which are members, and a user equipment 20E that does not belong to the UE group to which the user equipment 20A and the like belong. Therefore, the user equipment 20E executes the autonomous resource selection. Here, since the user equipment 20 belonging to the UE group uses resources based on scheduling, both the scheduling type MAC and the autonomous resource selection type MAC are used in parallel.

Therefore, it is necessary to reduce the resource collision or to select the MAC mechanism.

Figure 5:
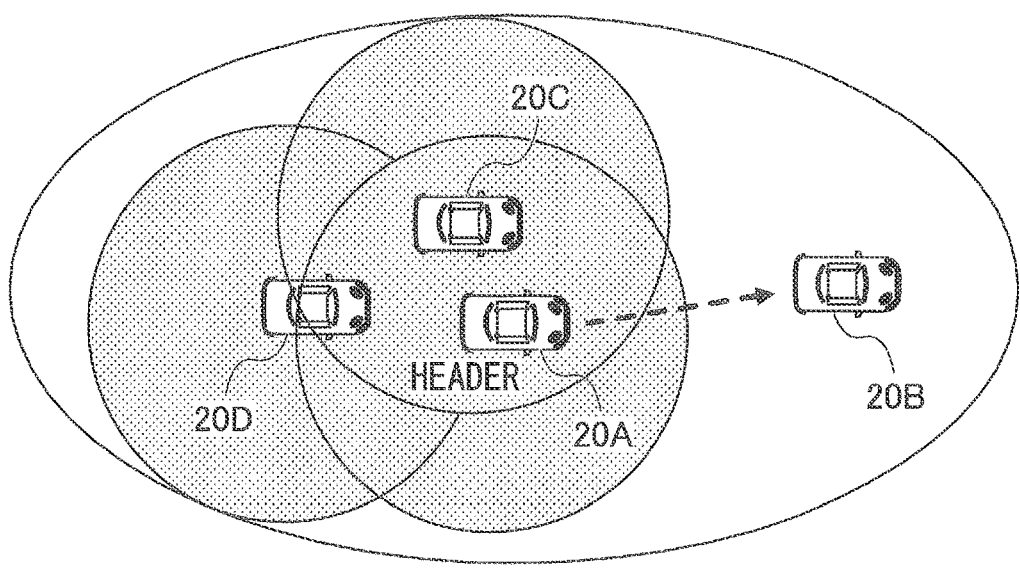
FIG. 5 is a diagram for illustrating an example (2) of an operation of the user equipment in an embodiment of the present invention.

FIG. 5 is a diagram for illustrating an example (2) of an operation of the user equipment in an embodiment of the present invention. In FIG. 5, the UE group includes a user equipment 20A which is a header and a user equipment 20B, a user equipment 20C, and a user equipment 20D which are members. Here, although the user equipment 20B belongs to the UE group, the user equipment 20B is unable to receive scheduling or resource allocation from the user equipment 20A since resources are insufficient. Therefore, the user equipment 20B executes the autonomous resource selection. Since the user equipment 20A, the user equipment 20B, or the user equipment 20C uses resources based on scheduling, both the scheduling type MAC and the autonomous resource selection type MAC are used in parallel. Therefore, it is necessary to reduce the resource collision or to select the MAC mechanism.

In this regard, when the MAC mechanisms of performing different resource selection methods are used between the user equipment 20, the resource collision can be reduced by the following method 1) or 2).

1) It is predefined whether resource pools orthogonal to each other are configured for the user equipment 20 operating with the scheduling type MAC and the user equipment 20 operating with the autonomous resource selection type MAC, respectively. In other words, it is specified in advance whether or not one MAC mechanism is configured for each resource pool. PHY layer signaling or upper layer signaling is used to notify of the configuration of the resource pool. For example, downlink control information (DCI), sidelink control information (SCI), a MAC control element (MAC-CE), a MAC header, or radio resource control (RRC) signaling may be used. Further, cell specific signaling, UE group common signaling, UE group specific signaling, UE common signaling, and/or UE specific signaling may be used to notify of the configuration of the resource pool.

2) It is specified in advance whether or not a resource pool shared by the user equipment 20 operating with the scheduling type MAC and the user equipment 20 operating with the autonomous resource selection type MAC is configured. PHY layer signaling or upper layer signaling is used to notify of the configuration of the resource pool. For example, the DCI, the SCI, the MAC-CE, the MAC header, or the RRC signaling may be used. Further, cell specific signaling, UE group common signaling, UE group specific signaling, UE common signaling, and/or UE specific signaling may be used to notify of the configuration of the resource pool. The user equipment 20 executes the autonomous resource selection while avoiding a collision with the resource allocated based on scheduling.

Figure 6:
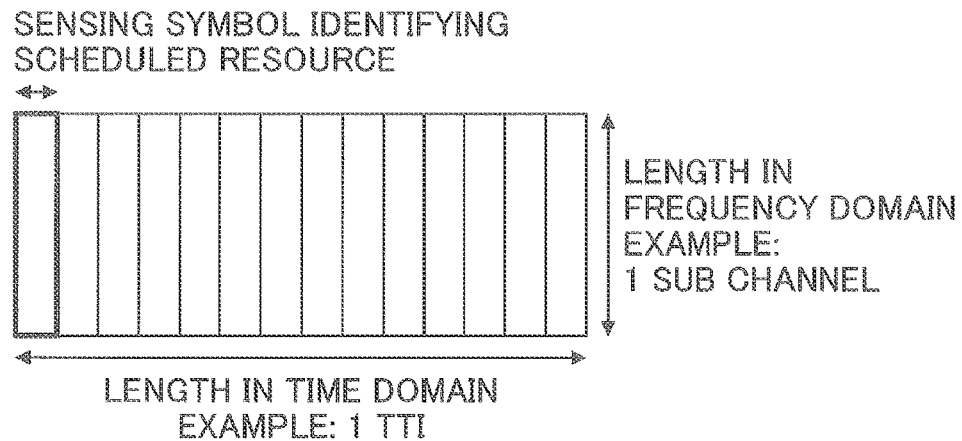
FIG. 6 is a diagram illustrating an example (1) of sensing in an embodiment of the present invention.

FIG. 6 is a diagram illustrating an example (1) of sensing in an embodiment of the present invention. The resource pool configured or predefined as described in 2) above is designed to have a specific structure for allowing the user equipment 20 to perform autonomous resource selection for detecting whether a resource is occupied or a resource is scheduled.

A sensing unit is configured or specified in advance in a resource unit. The sensing unit is a unit of a period in which sensing is executed and may be, for example, one or more symbols. A symbol constituting the sensing unit is referred to as a sensing symbol. The resource unit is a unit in which a resource is allocated, and a resource set may be constituted by a plurality of resource units. For example, the sensing unit is configured for one scheduled resource unit included in the resource set. A length of the resource unit in the time domain may be, for example, 1 slot, 1 mini slot, 1 sub frame, or 1 TTI. One or more symbols from the beginning of the resource unit are used as the sensing symbol which is the sensing unit. Further, one or more symbols from the beginning of the resource unit may be similarly used as an auto gain control (AGC) training symbol.

FIG. 6 illustrates an example of one resource unit, in which a length in the frequency domain is one sub channel, a length in the time domain is one TTI, and one symbol at the head of the resource unit is a sensing symbol identifying a resource to be scheduled to other units of user equipment.

Figure 7:
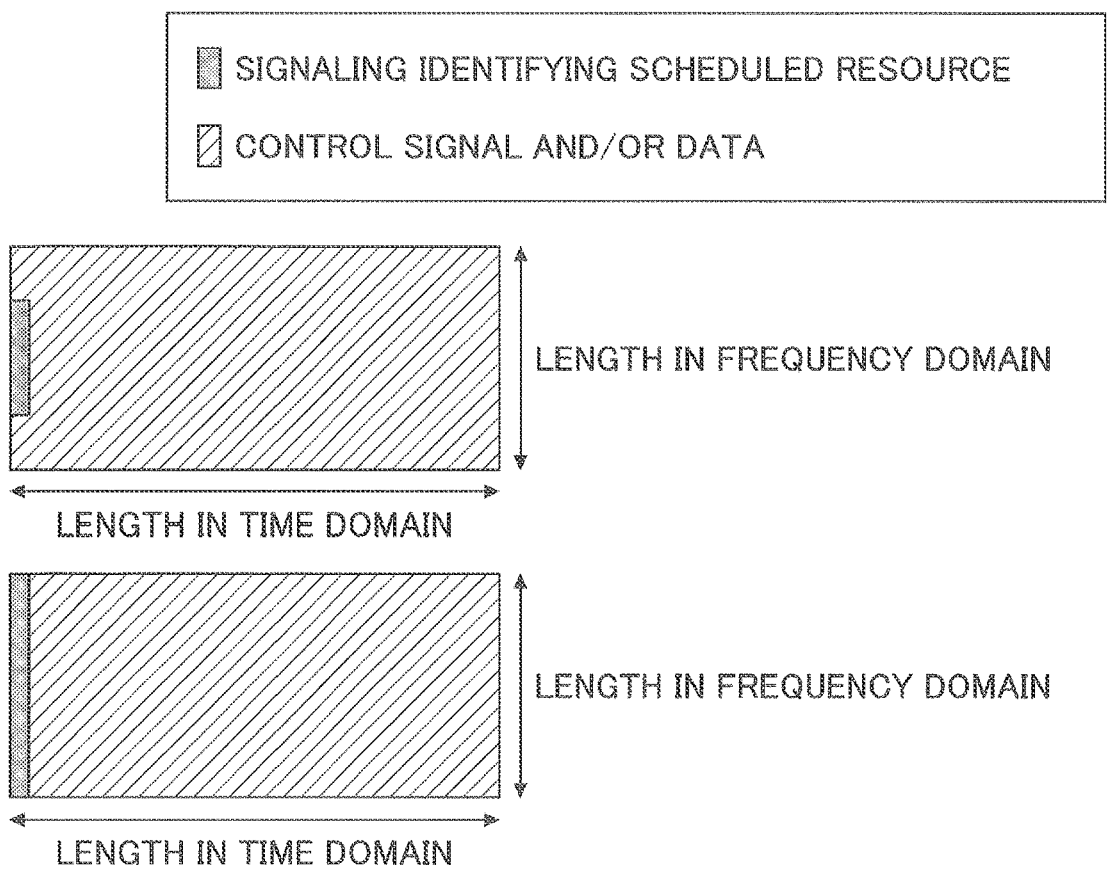
FIG. 7 is a diagram illustrating an example (1) of resource arrangement in an embodiment of the present invention.

FIG. 7 is a diagram illustrating an example (1) of a resource arrangement in an embodiment of the present invention. In a case in which the user equipment 20 performs message transmission with a resource unit scheduled to its own device, the user equipment 20 may transmit signaling in the sensing unit to indicate that the resource unit is scheduled. For example, as illustrated in FIG. 7, signaling for identifying that the resource unit is scheduled may be transmitted in a time domain before a message or in a time domain at a start of the resource unit, while being time division multiplexed or frequency division multiplexed with the message transmission. The signaling for identifying that the resource unit is scheduled may be a sensing reference signal transmitted at the start of the transmission of the message. Further, for example, the message is control signaling and/or data in a physical sidelink broadcast channel (PSBCH), a physical sidelink control channel (PSCCH), a physical sidelink shared channel (PSSCH), or a physical sidelink discovery channel (PSDCH).

Figure 8:
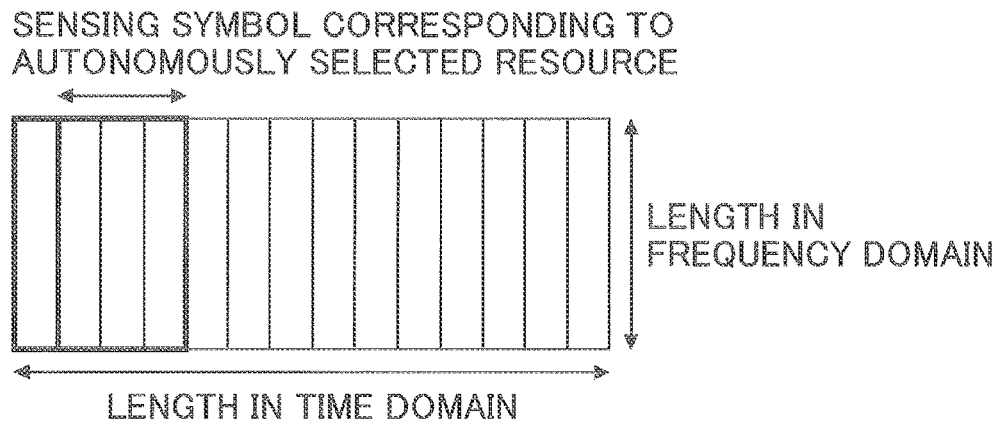
FIG. 8 is a diagram illustrating an example (2) of sensing in an embodiment of the present invention.

FIG. 8 is a diagram illustrating an example (2) of sensing in an embodiment of the present invention. A sensing unit identifying a resource unit scheduled to another user equipment or the like may be different from a sensing unit identifying a resource unit selected by autonomous resource selection by other units of user equipment or the like. The sensing unit identifying the resource unit scheduled to other units of user equipment or the like may be configured or specified in advance in a time domain before the sensing unit identifying the resource unit selected by autonomous resource selection by other units of user equipment or the like. FIG. 8 illustrates an example in which the sensing unit identifying the resource unit scheduled to other units of user equipment or the like is configured in a first symbol of the resource unit, and the sensing unit identifying the resource unit selected by autonomous resource selection by other units of user equipment or the like is configured in a second symbol, a third symbol, and a fourth symbol from the beginning. The length of the sensing unit is not limited to three symbols and may be an arbitrary number of symbols of 1 or more.

Figure 9:
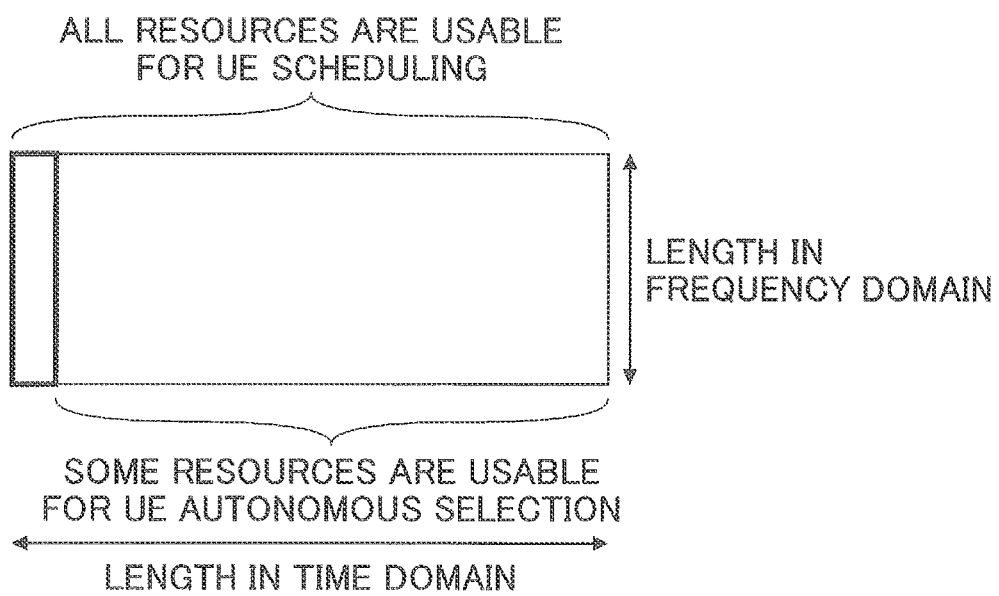
FIG. 9 is a diagram illustrating an example (2) of a resource arrangement in an embodiment of the present invention.

FIG. 9 is a diagram illustrating an example (2) of a resource arrangement in an embodiment of the present invention. When the sensing described in FIG. 8 is executed, as illustrated in FIG. 9, all of resources in the time domain can be used for the UE scheduling. On the other hand, a part of the resources can be used for the UE autonomous selection in the time domain.

Figure 10:
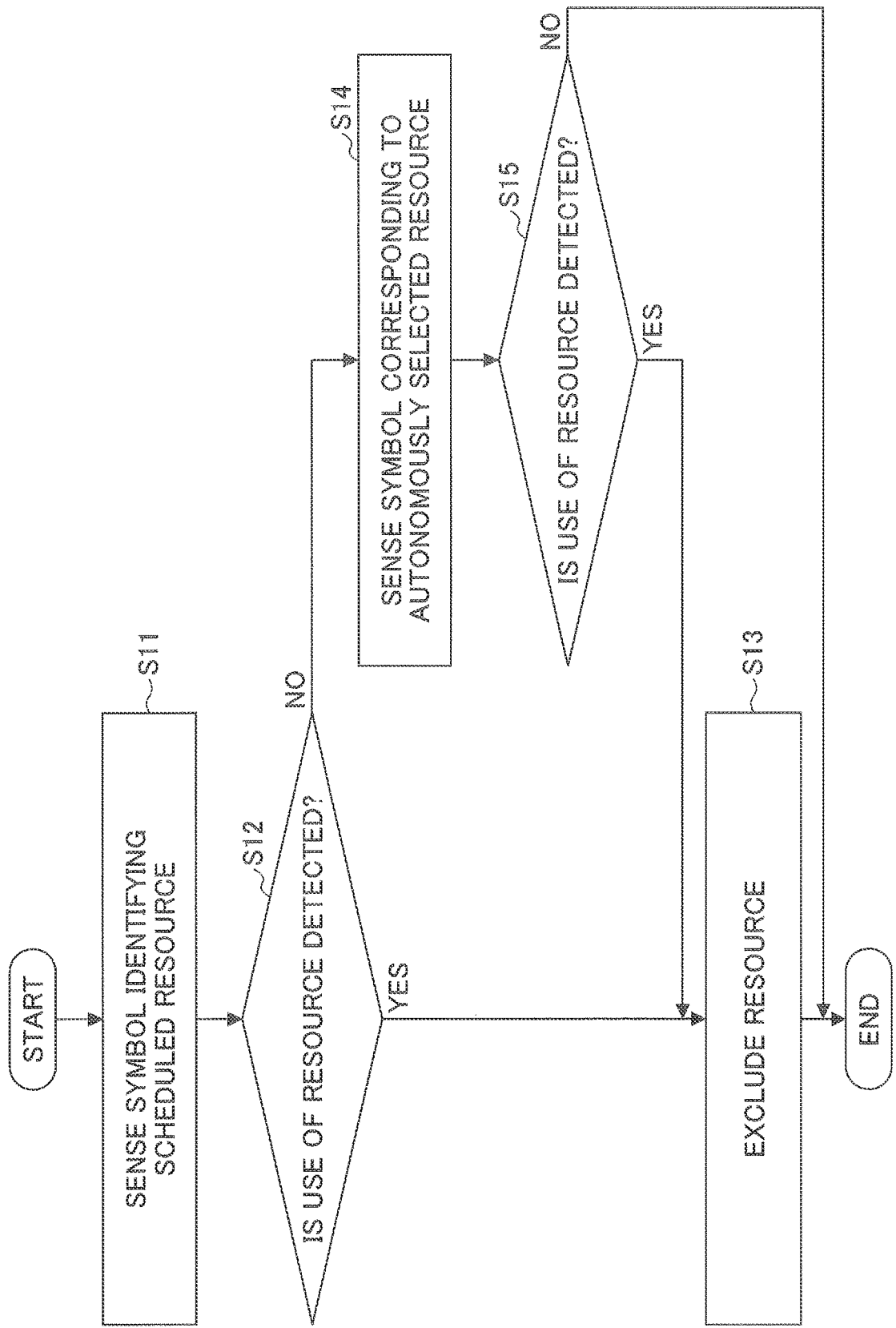
FIG. 10 is a diagram for illustrating an example (1) of an operation related to resource exclusion in an embodiment of the present invention.

FIG. 10 is a diagram for illustrating an example (1) of an operation related to resource exclusion in an embodiment of the present invention. The user equipment 20 that executes the autonomous resource selection may execute sensing for the sensing unit identifying the resource unit scheduled to other units of user equipment or the like and the sensing unit identifying the resource unit selected by autonomous resource selection by other units of user equipment or the like. In a case in which the resource unit is the resource unit scheduled to other units of user equipment or the like or the resource unit selected by the autonomous resource selection by other units of user equipment or the like, the user equipment 20 excludes the resource unit from candidate resources to be used for transmission of its own device. In a case in which a measurement result in the sensing unit exceeds a configured or pre-specified threshold value, the resource unit corresponding to the sensing unit is excluded from the candidate resources used for transmission. Examples of the measurement result include a reference signal received power (RSRP), a received signal strength indicator (RSSI), a reference signal received quality (RSRQ), and a signal to interference plus noise ratio (SINR).

Further, when a resource unit scheduled to other units of user equipment or the like is detected, the user equipment 20 need not execute sensing in the sensing unit identifying the resource unit selected by the autonomous resource selection. On the other hand, when a resource unit scheduled to other units of user equipment or the like is not detected, the user equipment 20 executes sensing in the sensing unit identifying the resource unit selected by autonomous resource selection by other units of user equipment or the like.

Hereinafter, the resource unit is also referred to as a resource. In step S11, the user equipment 20 senses a symbol included in the sensing unit identifying a resource to be scheduled. Then, the user equipment 20 determines whether or not the use of the resource is detected (S12). When the use of the resource is detected (YES in S12), the process proceeds to step S13, and when the use of the resource is not detected (NO in S12), the process proceeds to step S14. In step S13, the user equipment 20 excludes the resource in which the use of the resource is detected from the candidate resources used for transmission.

On the other hand, in step S14, the user equipment 20 senses the symbol corresponding to the autonomously selected resource. Then, the user equipment 20 determines whether or not the use of the resource is detected (S15). When the use of the resource is detected (YES in S15), the process proceeds to step S13, and the resource in which the use of the resource is detected is excluded from the candidate resources used for transmission, and when the use of the resource is not detected (NO in S15), the flow ends.

Figure 11:
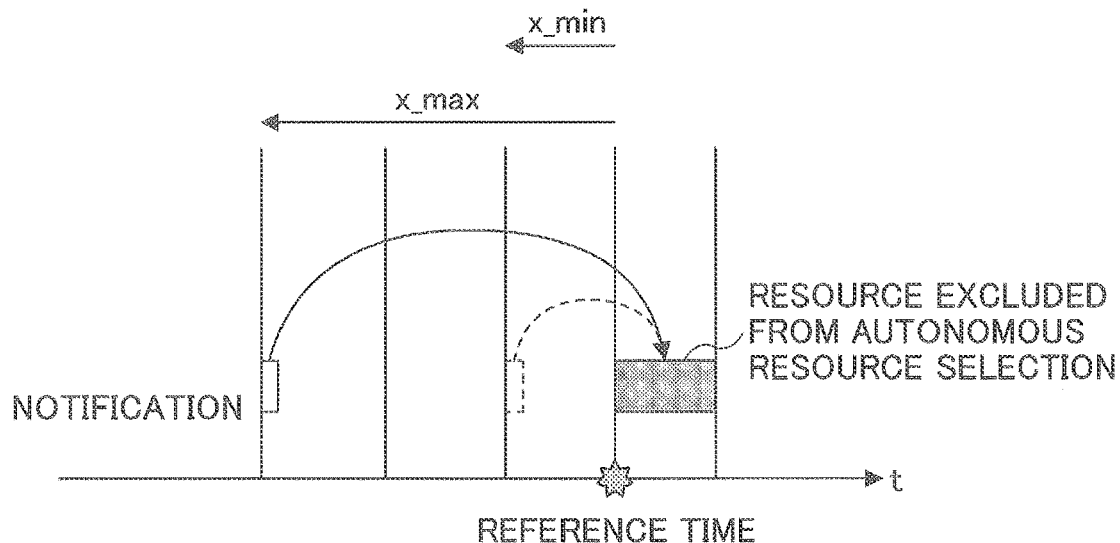
FIG. 11 is a diagram illustrating an example of a notification related to a resource to be scheduled in an embodiment of the present invention.

FIG. 11 is a diagram illustrating an example of a notification related to a scheduled resource in an embodiment of the present invention. As illustrated in FIG. 11, in order to prevent the user equipment 20 that executes the autonomous resource selection from selecting the resource scheduled to other units of user equipment or the like, a notification of the scheduled resource may be given to the user equipment 20 that executes the autonomous resource selection before message transmission. The notification may be transmitted to the user equipment 20 in an x-th symbol, an x-th slot, an x-th mini slot, an x-th sub frame or an x-th TTI before the message transmission. As x, a fixed value is configured or specified in advance. Further, x may be designated by a range. For example, x may be designated by a range from x min to x max.

Further, the notification of the scheduled resource may be a notification via resource reservation. For example, when message transmission is performed periodically, the resource reservation including a resource to be used for subsequent message transmission may be performed.

Further, PHY layer signaling or upper layer signaling is used for the notification of the scheduled resource. For example, the DCI, the SCI, the MAC-CE, the MAC header, or the RRC signaling may be used. When the notification of the scheduled resource is received or when it is detected that a measurement result of sensing a resource in which the notification of the scheduled resource is transmitted exceeds a predetermined threshold value, the user equipment 20 excludes the notified resource from the candidate resources used for transmission. The measurement result is the RSRP, the RSSI, the RSRQ, the SINR, or the like.

Figure 12:
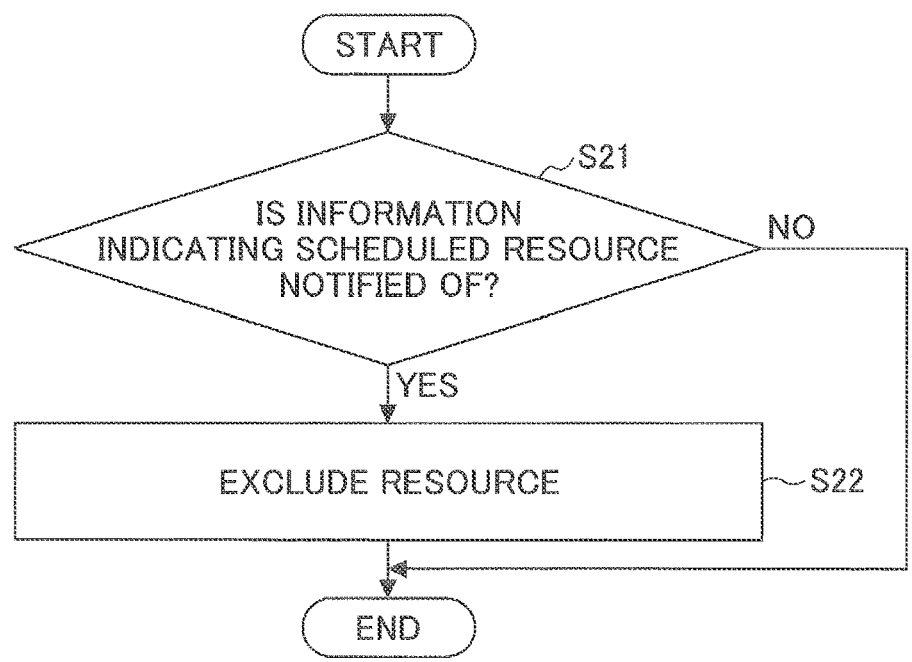
FIG. 12 is a diagram for illustrating an example (2) of an operation related to resource exclusion in an embodiment of the present invention.

FIG. 12 is a diagram for illustrating an example (2) of an operation related to resource exclusion in an embodiment of the present invention. In step S21, the user equipment 20 determines whether there is a notification of information indicating the scheduled resource to other unit of user equipment or the like. When there is notification of the information indicating the scheduled resource to other units of user equipment of the like (YES in S21), the process proceeds to step S22, and when there is no notification of the information indicating the resource scheduled to other units of user equipment or the like (NO in S21), the flow ends. In step S22, the notified resource is excluded from the candidate resources used for transmission.

Figure 13:
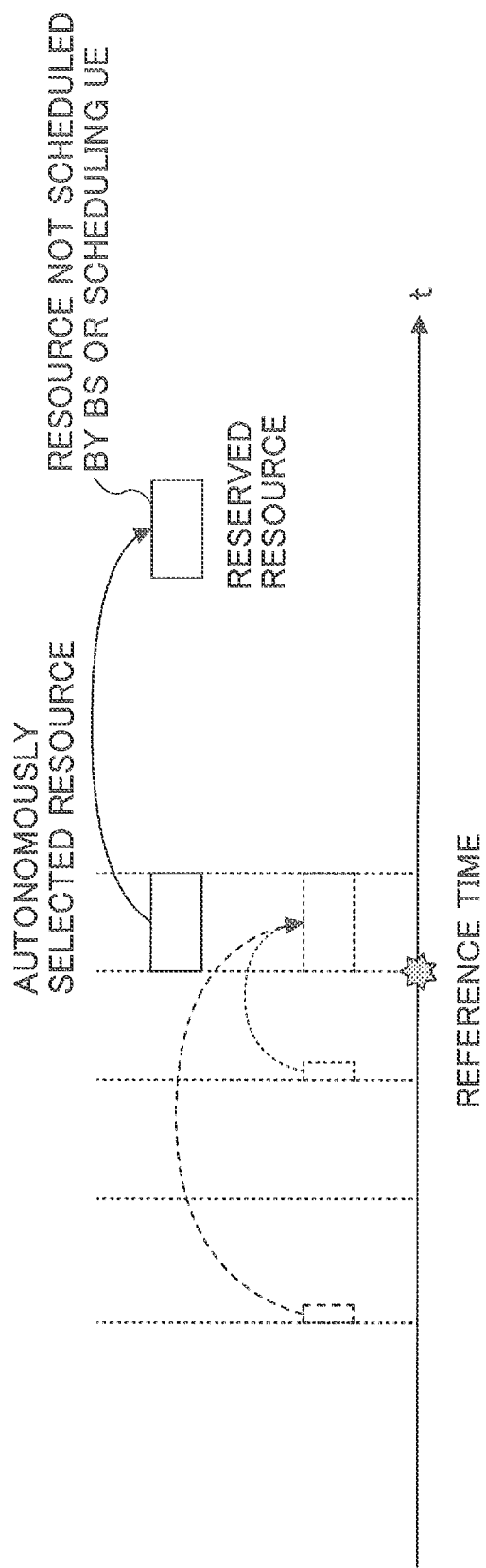
FIG. 13 is a diagram illustrating an example of a notification related to a resource to be reserved in an embodiment of the present invention.

FIG. 13 is a diagram illustrating an example of a notification related to a reserved resource in an embodiment of the present invention. As illustrated in FIG. 13, the user equipment 20 that executes the autonomous resource selection may reserve a resource to be used for transmission in a next period of transmission in an autonomously selected resource. For example, the resource reservation by periodic traffic is assumed.

PHY layer signaling or upper layer signaling is used for a notification of information for reserving a resource used for transmission in the next period in the autonomously selected resource. For example, the UCI, the SCI, the MAC-CE, the MAC header, or the RRC signaling may be used. It may be configured or specified in advance whether or not the reservation is permitted.

When the information for reserving the resource used for the transmission in the next cycle of the transmission in the autonomously selected resource is detected, the base station device 10 or the user equipment 20 executing the scheduling may avoid scheduling the resource reserved for the other units of user equipment 20. When the reserved resource is a resource to be scheduled to other units of user equipment 20, a new resource may be rescheduled to the user equipment 20 which has transmitted the information for reserving the resource. It may be configured or specified in advance that the rescheduled resource is given a priority over a resource which is autonomously selected or reserved. For example, the priority order of resources may be as follows. A first degree of priority is given a priority over a second degree of priority, and the second degree of priority is given a priority over a third degree of priority.

The first degree of priority: resources scheduled by the base station device 10

The second degree of priority: resources scheduled by the user equipment 20

The third degree of priority: resources autonomously selected by the user equipment 20

When information for reserving the resource used for the transmission in the next cycle of the transmission in the autonomously selected resource that is transmitted from another units of user equipment 20 is detected, the detecting user equipment 20 that executes autonomous resource selection may exclude the resource from the candidate resources used for transmission.

Figure 14:
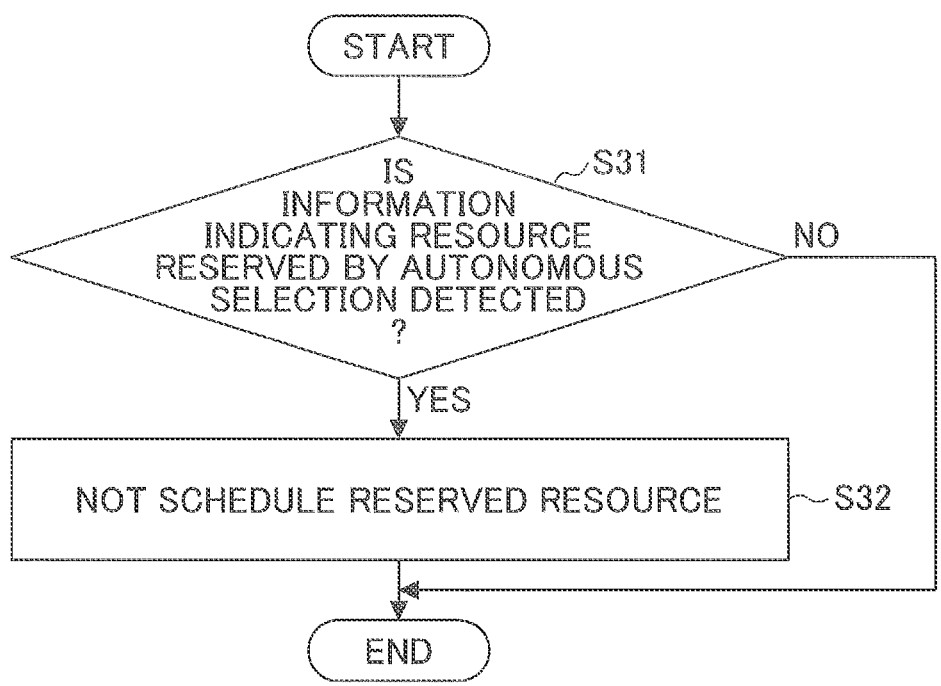
FIG. 14 is a diagram for illustrating an example of an operation related to scheduling in an embodiment of the present invention.

FIG. 14 is a flowchart for illustrating an example of an operation related to scheduling in an embodiment of the present invention. In step S31, the base station device 10 or the user equipment 20 executing the scheduling determines whether or not the information indicating the resource reserved by the autonomous selection is detected. When the information indicating the resource reserved by the autonomous selection is detected (YES in S31), the process proceeds to step S32, and when the information indicating the resource reserved by the autonomous selection is not detected (NO in S32), the flow ends. In step S32, the base station device 10 or the user equipment 20 executing the scheduling does not use the notified reserved resource for scheduling.

Figure 15:
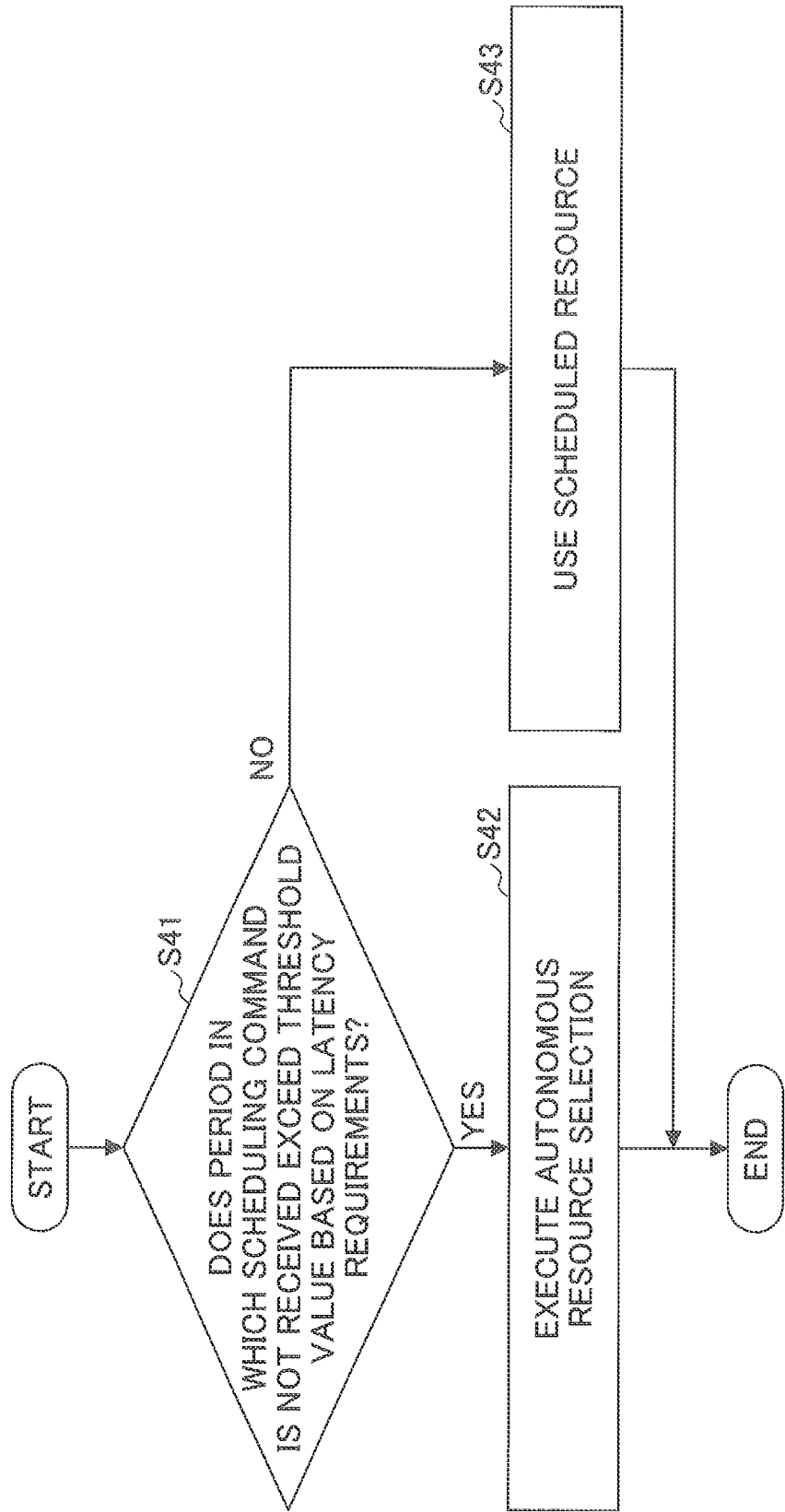
FIG. 15 is a diagram for illustrating an example of an operation related to MAC selection in an embodiment of the present invention.

FIG. 15 is a flowchart for illustrating an example of an operation related to MAC selection in an embodiment of the present invention. The user equipment 20 may determine selection of any one of the scheduling type MAC and the autonomous resource selection type MAC based on any one of 1) to 4) to be described below or a combination thereof.

1) The user equipment 20 selects the scheduling type MAC when the user equipment 20 is the header or the member of the UE group, and otherwise selects the autonomous resource selection type MAC.

2) The user equipment 20 selects the autonomous resource selection type MAC when a scheduling command is not received until x symbols, x slot, x mini slots, x sub frames, x TTIs, or x ms's after the user equipment 20 transmits the SR. A value of x may be configured or specified in advance. The details of an autonomous resource selection operation such as random selection or sensing execution may be configured or specified in advance, or may be performed based on UE implementation.

3) The user equipment 20 selects the autonomous resource selection type MAC when a period during which the scheduling command is not received exceeds x symbols, x slot, x mini slots, x sub frames, x TTIs, or x ms's which are a threshold value based on latency requirements. A value of x may be configured or specified in advance. The details of an autonomous resource selection operation such as random selection or sensing execution may be configured or specified in advance, or may be performed based on UE implementation. FIG. 15 is a flowchart for illustrating the above operation. In step S41, it is determined whether the period during which the scheduling command is not received exceeds the threshold value based on latency requirements. When the threshold value is exceeded (YES in S41), the process proceeds to step S42, and when the threshold value is not exceeded (NO in S41), the process proceeds to step S43. In step S42, the user equipment 20 selects the autonomous resource selection type MAC and executes the autonomous resource selection. In step S43, the user equipment 20 selects or continues the scheduling type MAC and uses the scheduled resource.

4) The base station device 10 or the user equipment 20 executing scheduling configures a MAC mechanism to be used. The base station device 10 which is the scheduler or the user equipment 20 executing the scheduling excludes a certain user equipment 20 from the UE group. The excluded user equipment 20 selects the autonomous resource selection type MAC. The exclusion may be temporary, or the exclusion may continue for x times of message transmission or for a period corresponding to x symbols/slots/mini slots/sub frames/TTIs/ms. Further, there may be explicit notification of cancellation of the exclusion. PHY layer signaling or upper layer signaling is used to transmit information indicating the exclusion, information indicating the cancellation of the exclusion, or transmission of the value of x. For example, the DCI, the SCI, the MAC-CE, the MAC header, or the RRC signaling may be used. Further, the base station device 10 which is the scheduler or the user equipment 20 which executes the scheduling may cause a certain user equipment 20 to select the autonomous resource selection type MAC by transmitting a control signal (for example, a scheduling command or a resource configuration/notification) related to scheduling or resource allocation. The control signal may include a resource set or a resource unit used for the autonomous resource selection. The details of an autonomous resource selection operation such as random selection or sensing execution may be configured or specified in advance, or may be performed based on UE implementation. PHY layer signaling or upper layer signaling is used for the notification of the control signal. For example, the DCI, the SCI, the MAC-CE, the MAC header, or the RRC signaling may be used. Further, UE specific signaling, UE common signaling, UE group specific signaling, UE group common signaling, and/or cell specific signaling may be used for the notification of the control signal.

Further, a message which is SL-transmitted may be any signaling. For example, the control signal and/or data transmitted through any one of the PSBCH, the PSCCH, the PSSCH, or the PSDCH may be a message. Further, the user equipment 20 may be supported to configure one or more resource allocation mechanisms. The resource allocation mechanism to be used may be configured or specified in advance. Further, it may be defined as a UE capability that the user equipment 20 can configure one or more resource allocation mechanisms. For example, the UE capability includes information indicating the resource allocation mechanism to be supported.

According to the above-described embodiment, when the scheduling type MAC such as the centralized MAC or the semi-distributed MAC coexists with the autonomous resource selection type MAC such as the distributed MAC, the user equipment 20 can improve the performance of the system by preventing the collision of the SL resource.

In other words, it is possible to reduce the collision of the resources used by the user equipment in the inter-terminal direct communication.

(Device Configuration)

Next, a functional configuration example of each of the base station device 10 and the user equipment 20 that execute the processes and the operation described so far will be described. Each of the base station device 10 and the user equipment 20 has the function of implementing the embodiment. Here, each of the base station device 10 and the user equipment 20 may have only some of the functions in the embodiment.

<Base Station Device 10>

Figure 16:
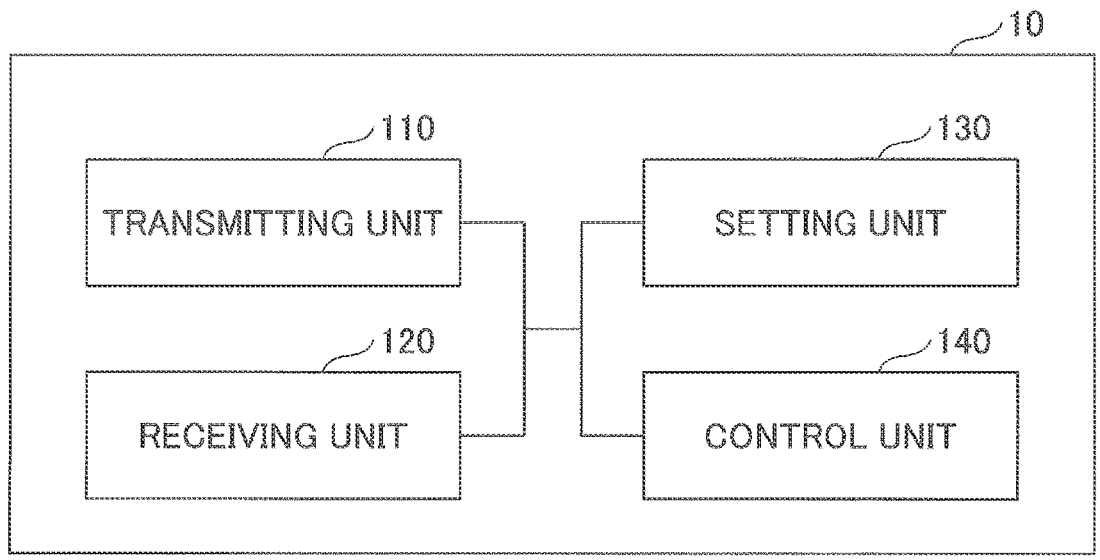
FIG. 16 is a diagram illustrating an example of a functional configuration of a base station device 10 in an embodiment of the present invention.

FIG. 16 is a diagram illustrating an example of a functional configuration of the base station device 10. As illustrated in FIG. 16, the base station device 10 has a transmitting unit 110, a receiving unit 120, a setting unit 130, and a control unit 140. The functional configuration illustrated in FIG. 12 is merely an example. As long as the operation according to an embodiment of the present invention can be executed, the function classification and the name of the function unit are not consequential.

The transmitting unit 110 has a function of generating a signal to be transmitted to the user equipment 20 and transmitting the signal wirelessly. The receiving unit 120 has a function of receiving various types of signals transmitted from the user equipment 20 and acquiring, for example, information of a higher layer from the received signals. The transmitting unit 110 has a function of transmitting the NR-PSS, the NR-SSS, the NR-PBCH, the DL/UL control signal, the DL reference signal, or the like to the user equipment 20.

The setting unit 130 stores pre-configured configuration information and various types of configuration information to be transmitted to the user equipment 20 in the storage device and reads the configuration information from the storage device if necessary. For example, content of the configuration information is, for example, information related to a resource configuration of the D2D communication or the like.

As described in the embodiment, the control unit 140 performs a process related to the resource configuration used for the user equipment 20 to perform the D2D communication. The control unit 140 transmits the scheduling of the D2D communication to the user equipment 20 via the transmitting unit 110. A functional unit related to signal transmission in the control unit 140 may be included in the transmitting unit 110, and a functional unit related to signal reception in the control unit 140 may be included in the receiving unit 120.

<User Equipment 20>

Figure 17:
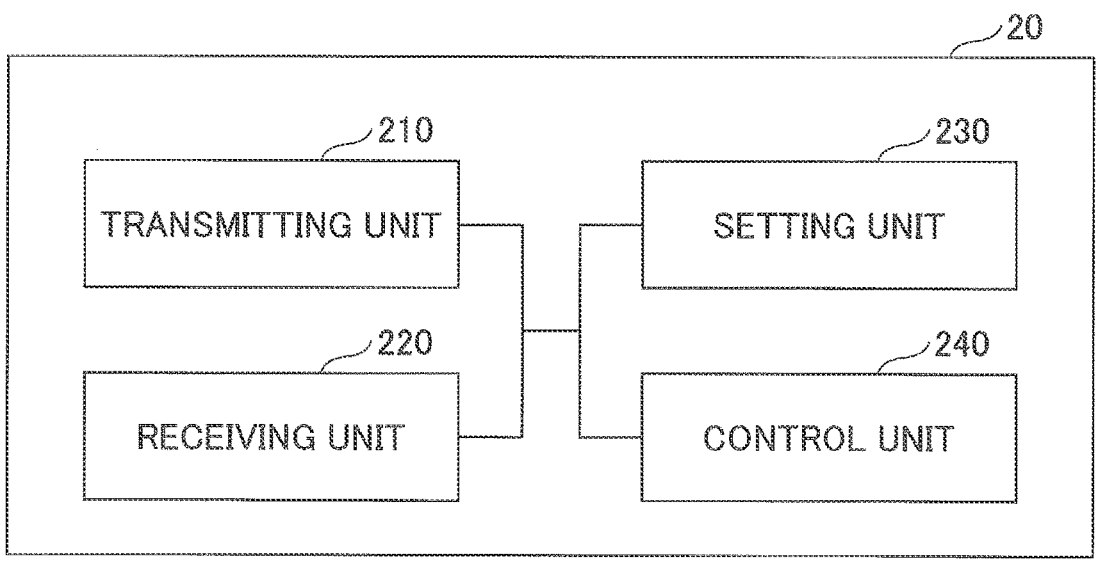
FIG. 17 is a diagram illustrating an example of a functional configuration of a user equipment 20 in an embodiment of the present invention.

FIG. 17 is a diagram illustrating an example of a functional configuration of the user equipment 20. As illustrated in FIG. 17, the user equipment 20 has a transmitting unit 210, a receiving unit 220, a setting unit 230, and a control unit 240. The functional configuration illustrated in FIG. 17 is merely an example. As long as the operation according to an embodiment of the present invention can be executed, the function classification and the name of the function unit are not consequential.

The transmitting unit 210 generates a transmission signal from transmission data and transmits the transmission signal wirelessly. The receiving unit 220 wirelessly receives various types of signals, and acquires a signal of a higher layer from a received signal of a physical layer. The receiving unit 220 also has a function of receiving the NR-PSS, the NR-SSS, the NR-PBCH, the DL/UL/SL control signal, the reference signal, or the like transmitted from the base station device 10. Further, for example, the transmitting unit 210 may transmit a physical sidelink control channel (PSCCH), a physical sidelink shared channel (PSSCH), a physical sidelink discovery channel (PSDCH), a physical sidelink broadcast channel (PSBCH), and the like to other units of user equipment 20 as the D2D communication, and the receiving unit 220 receives the PSCCH, the PSSCH, the PSDCH, the PSBCH, and the like from other units of user equipment 20.

The setting unit 230 stores various types of configuration information received from the base station device 10 or the user equipment 20 through the receiving unit 220 in the storage device and reads the configuration information from the storage device if necessary. The setting unit 230 also stores pre-configured configuration information. For example, content of the configuration information is, for example, information related to the configuration of the D2D communication or the like.

The control unit 240 controls the D2D communication with other units of user equipment 20 as described in the embodiment. Further, the control unit 240 executes the sensing and the autonomous resource selection. Further, the control unit 240 may execute the scheduling of the D2D communication. A functional unit related to signal transmission in the control unit 240 may be included in the transmitting unit 210, and a functional unit related to signal reception in the control unit 240 may be included in the receiving unit 220.

(Hardware Configuration)

In the block diagrams (FIGS. 16 and 17) used for the description of the above embodiment, the blocks of the functional units are illustrated. The functional blocks (configuring units) are implemented by at least an arbitrary combination of hardware and/or software. A method of implementing each functional block is not particularly limited. In other words, each functional block may be implemented by one device in which a plurality of elements are physically and/or logically combined or may be implemented by a plurality of devices, that is, two or more devices which are physically and/or logically separated and are directly and/or indirectly connected (for example, in a wired and/or wireless manner or the like). The function block may be realized by combining software with one device or a plurality of devices.

The functions include determining, deciding, judging, computing, calculating, processing, deriving, investigating, searching, confirming, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, and the like but are not limited thereto. For example, a functional block (configuring unit) that causes transmission to function is referred to as a transmitting unit or a transmitter. In any case, as described above, an implementation method is not particularly limited.

Figure 18:
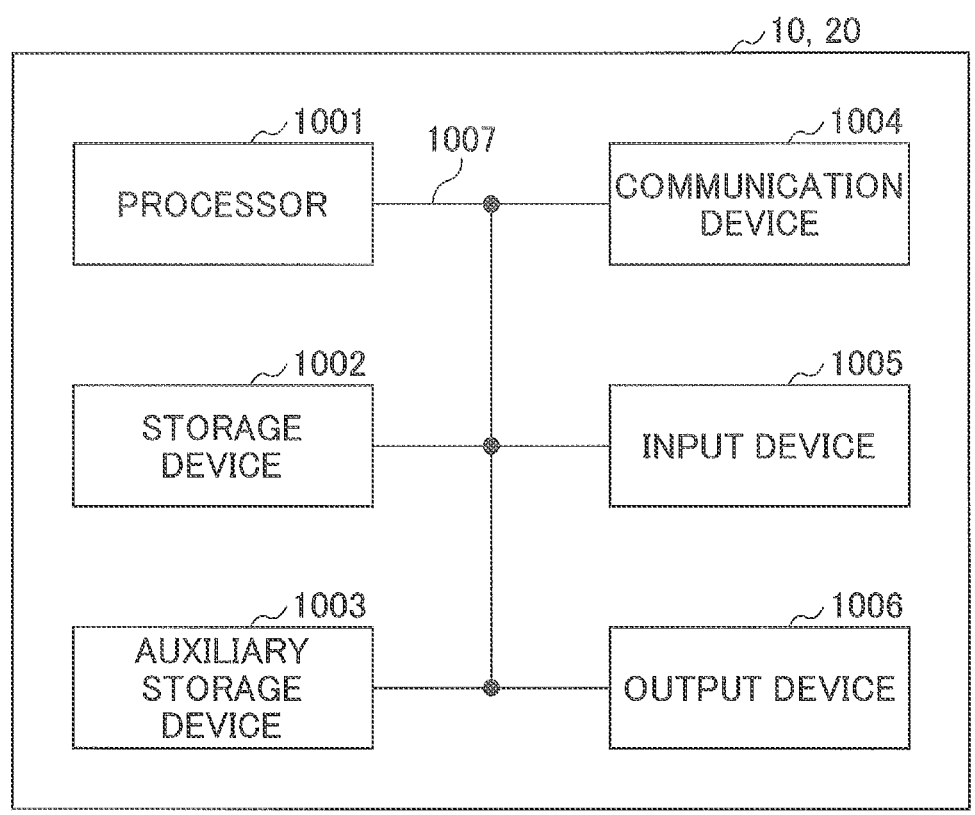
FIG. 18 is a diagram illustrating an example of a hardware configuration of a base station device 10 or a user equipment 20 in an embodiment of the present invention.

For example, the base station device 10, the user equipment 20, or the like in one embodiment of the present disclosure may function as a computer for processing the present disclosure's wireless communication method. FIG. 18 is a diagram illustrating an example of a hardware configuration of the base station device 10 and the user equipment 20 according to an embodiment of the present disclosure. Each of the base station device 10 and the user equipment 20 may be physically configured as a computer device including a processor 1001, a storage device 1002, an auxiliary storage device 1003, a communication device 1004, an input device 1005, an output device 1006, a bus 1007, and the like.

In the following description, the term "device" can be read as a circuit, device, unit, or the like. The hardware configuration of each of the base station device 10 and the user equipment 20 may be configured to include one or more devices illustrated in the drawing or may be configured without including some devices.

Each function in each of the base station device 10 and the user equipment 20 is implemented such that predetermined software (program) is read on hardware such as the processor 1001 and the storage device 1002, and the processor 1001 performs an operation and controls communication by the communication device 1004 and reading and/or writing of data in the storage device 1002 and the auxiliary storage device 1003.

For example, the processor 1001 operates an operating system and controls the entire computer. The processor 1001 may be configured with a central processing unit (CPU) including an interface with a peripheral device, a control device, an operation device, a register, and the like. For example, the control unit 140, the control unit 240, and the like described above may be implemented by the processor 1001.

Further, the processor 1001 reads a program (program code), a software module, or data from at least one of the auxiliary storage device 1003 and/or the communication device 1004 out to the storage device 1002, and executes various types of processes according to them. A program causing a computer to execute at least some of the operations described in the above embodiment is used as the program. For example, the control unit 140 of the base station device 10 illustrated in FIG. 16 may be implemented by a control program which is stored in the storage device 1002 and operates on the processor 1001. Further, for example, the control unit 240 of the user equipment 20 illustrated in FIG. 17 may be implemented by a control program which is stored in the storage device 1002 and operates on the processor 1001. Various types of processes have been described as being performed by one processor 1001 but may be performed simultaneously or sequentially by two or more processors 1001. The processor 1001 may be implemented by one or more chips. The program may be transmitted from a network via an electric communication line.

The storage device 1002 is a computer readable recording medium and configured with at least one of a read only memory (ROM), an erasable programmable ROM (EPROM), an electrically erasable programmable ROM (EEPROM), a random access memory (RAM), and the like. The storage device 1002 is also referred to as a "register," a "cache," a "main memory," or the like. The storage device 1002 can store programs (program codes), software modules, or the like which are executable for carrying out the communication method according to an embodiment of the present disclosure.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The auxiliary storage device 1003 is also referred to as an "auxiliary storage device." The storage medium may be, for example, a database, a server, or any other appropriate medium including at least one of the storage device 1002 and the auxiliary storage device 1003.

The communication device 1004 is hardware (a transceiving device) for performing communication between computers via at least one of a wired network and a wireless network and is also referred to as a "network device," a "network controller," a "network card," a "communication module," or the like. The communication device 1004 may include a high-frequency switch, a duplexer, a filter, a frequency synthesizer, or the like in order to implement at least one of frequency division duplex (FDD) and time division duplex (TDD). For example, a transceiving antenna, an amplifying unit, a transmitting/receiving unit, a transmission line interface, or the like may be implemented by the communication device 1004. The transmitting/receiving unit may be implemented by to be physically or logically separated by a transmitting unit and a receiving unit.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integratedly configured (for example, a touch panel).

The respective devices such as the processor 1001 and the storage device 1002 are connected via the bus 1007 to communicate information with each other. The bus 1007 may be configured with a single bus or may be configured with different buses between the devices.

Further, each of the base station device 10 and the user equipment 20 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented using at least one of these pieces of hardware.

CONCLUSION OF THE EMBODIMENTS

As described above, according to an embodiment of the present invention, provided is a user equipment that includes a receiving unit that executes sensing for a part of candidate resources to be used for transmission of inter-terminal direct communication, a control unit that determines a resource to be used for transmission based on a result of the sensing, and a transmitting unit that transmits a message to other units of user equipment using the determined resource.

With the above configuration, when the scheduling type MAC such as the centralized MAC or the semi-distributed MAC coexists with the autonomous resource selection type MAC such as the distributed MAC, the user equipment 20 can improve the performance of the system by preventing the collision of the SL resource. In other words, it is possible to reduce the collision of the resources used by the user equipment in the inter-terminal direct communication.

The part of the candidate resources to be used for the transmission may be one symbol at a beginning in a time domain of the candidate resources to be used for the transmission or a plurality of symbols allocated from a second symbol from the beginning. With this configuration, the user equipment 20 can detect early whether or not the resource is used by executing sensing near the beginning of the resource.

When it is detected that a resource is used in the one symbol at the beginning in the time domain of the candidate resource to be used for the transmission, the plurality of symbols allocated from the second symbol from the beginning may not be sensed. With this configuration, the user equipment 20 can suppress unnecessary sensing by performing sensing in one symbol at the beginning of the resource.

When it is not detected that a resource is used in the one symbol at the beginning in the time domain of the candidate resource to be used for the transmission, the plurality of symbols allocated from the second symbol from the beginning may be sensed. With this configuration, the user equipment 20 can execute sensing only if necessary by performing sensing in one symbol at the beginning of the resource.

When a notification indicating that candidate resources to be used for transmission are scheduled is given, the candidate resources to be used for the transmission may not be sensed and may be excluded from resource candidates used for transmission. With this configuration, the user equipment 20 can suppress unnecessary sensing by being notified that the resource is scheduled.

According to an embodiment of the present invention, provided is a base station device including a receiving unit that receives information indicating that a candidate resource used for transmission of inter-terminal direct communication is reserved by a first user equipment and a control unit that prevents scheduling the candidate resources to be used for the transmission to a user equipment based on the information indicating the reservation, in which, when the candidate resource to be used for the transmission is already scheduled to a second user equipment, scheduling a new resource to the first user equipment is executed.

With the above configuration, when the scheduling type MAC such as the centralized MAC or the semi-distributed MAC coexists with the autonomous resource selection type MAC such as the distributed MAC, the user equipment 20 can improve the performance of the system by preventing the collision of the SL resource. In other words, it is possible to reduce the collision of the resources used by the user equipment in the inter-terminal direct communication.

Supplement of Embodiment

The exemplary embodiment of the present invention has been described above, but the disclosed invention is not limited to the above embodiments, and those skilled in the art would understand various modified examples, revised examples, alternative examples, substitution examples, and the like. In order to facilitate understanding of the invention, specific numerical value examples have been used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no inconsistency. For the sake of convenience of processing description, the base station device 10 and the user equipment 20 have been described using the functional block diagrams, but such devices may be implemented by hardware, software, or a combination thereof. Software executed by the processor included in the base station device 10 according to the embodiment of the present invention and software executed by the processor included in the user equipment 20 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Further, a notification of information is not limited to the aspect or embodiment described in the present disclosure and may be given by any other method. For example, the notification of information may be given by physical layer signaling (for example, downlink control information (DCI) or uplink control information (UCI)), upper layer signaling (for example, radio resource control (RRC) signaling, medium access control (MAC) signaling, broadcast information (master information block (MIB), system information block (SIB)), other signals, or a combination thereof. Further, the RRC signaling may be referred to as an RRC message and may be, for example, an RRC connection setup message, an RRC connection reconfiguration message, or the like.

Each aspect and embodiment of the present invention may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), New Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using any other appropriate system, and next generation systems extended based on these standards. Further, a plurality of systems may be combined and applied (for example, a combination of at least one of LTE and LTE-A and 5G or the like).

The processing procedures, the sequences, the flowcharts, and the like of the respective aspects/embodiments described in this specification may be reversed in order unless there is a contradiction. For example, the method described in the present disclosure presents elements of various steps using an exemplary order and is not limited to a presented specific order.

In this specification, a specific action that is supposed to be performed by the base station device 10 may be performed by an upper node in some cases. In the network including one or more network nodes including the base station device 10, various operations performed for communication with the user equipment 20 can be obviously performed by at least one of the base station and any network node (for example, an MME, an S-GW, or the like is considered, but it is not limited thereto) other than the base station device 10 and/or the base station device 10. The example in which the number of network nodes excluding the base station device 10 is one has been described above, but other network nodes in which a plurality of other network nodes (for example, an MME and an S-GW) are combined may be provided.

Information, a signal, or the like described in the present disclosure may be output from an upper layer (or a lower layer) to a lower layer (or an upper layer). Information, a signal, or the like described in the present disclosure may be input and output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination the present disclosure may be performed in accordance with a value (0 or 1) indicated by one bit, may be performed in accordance with a Boolean value (true or false), or may be performed by a comparison of numerical values (for example, a comparison with a predetermined value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Further, software, commands, information, and the like may be transmitted and received via a transmission medium. For example, when software is transmitted from a web site, a server, or any other remote source using a wired technology (such as a coaxial cable, a fiber optic cable, a twisted pair, or a digital subscriber line (DSL)) and a radio technology (such as infrared rays or a microwave), at least one of the wired technology and the radio technology are included in a definition of a transmission medium.

Information, signals, and the like described in this specification may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or an arbitrary combination thereof.

The terms described in the present disclosure and terms necessary for understanding the present disclosure may be replaced with terms having the same or similar meanings. For example, at least one of a channel and a symbol may be a signal. Further, a signal may be a message. Further, a component carrier (CC) may be referred to as a "carrier frequency," a "cell," or the like.

The terms "system" and "network" used in the present disclosure are used interchangeably.

Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names allocated to the various channels and the information elements are not limited in any respect.

In the present disclosure, the terms "base station (BS)," "radio base station," "base station device," "fixed station," "Node B," "eNode B (eNB)," "gNodeB (gNB)," "access point," "transmission point," "reception point," "transmission/reception point," "cell," "sector," "cell group," "carrier," "component carrier," and the like can be used interchangeably. The base stations may also be indicated by terms such as a macrocell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)," "user terminal," "user equipment (UE)," "terminal," and the like can be used interchangeably.

The mobile station may be a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, it may also be referred to as a remote terminal, handset, user agent, mobile client, client, or some other suitable term.

At least one of the base station and the mobile station may be also referred to as a transmitting device, a receiving device, a communication device, or the like. At least one of the base station and the mobile station may be a device installed in a mobile body, a mobile body itself, or the like. The moving body may be a vehicle (for example, a car, an airplane, or the like), a moving body that moves unmanned (for example, a drone, an autonomous car or the like), or a robot (manned type or unmanned type). At least one of the base station and the mobile station includes a device which need not necessarily move during a communication operation. For example, at least one of the base station and the mobile station may be an Internet of things (IoT) device such as a sensor.

Further, the base station in the present disclosure may be replaced with a user terminal. For example, each aspect/embodiment of the present disclosure may be applied to a configuration in which communication between the base station and the user terminal is replaced with communication between a plurality of units of user equipment 20 (for example, which may be referred to as device-to-device (D2D) or vehicle-to-everything (V2X)). In this case, the user equipment 20 may have the functions of the base station described above. Further, the terms "uplink" and "downlink" may be replaced with terms (for example, "side") corresponding to inter-terminal communication. For example, an uplink channel, a downlink channel, or the like may be read with side channels.

Similarly, the user terminal in the present disclosure may be replaced with the base station. In this case, the base station may have the functions of the above-mentioned user terminal.

The term "determining" used in this specification may include a wide variety of actions. For example, "determining" may include, for example, events in which events such as judging, calculating, computing, processing, deriving, investigating, looking up, search, and inquiry (for example, looking up in a table, a database, or another data structure), or ascertaining are regarded as "determining." Further, "determining" may include, for example, events in which events such as receiving (for example, receiving information), transmitting (for example, transmitting information), input, output, or accessing (for example, accessing data in a memory) are regarded as "determining." Further, "determining" may include, for example, events in which events such as resolving, selecting, choosing, establishing, or comparing are regarded as "determining." In other words, "determining" may include events in which a certain operation is regarded as "determining" or "deciding." Further, "determining" may be replaced with "assuming," "expecting," "considering," or the like.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case in which used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS and may be referred to as a pilot, depending on a standard to be applied.

A phrase "based on" used in the present disclosure is not limited to "based on only" unless otherwise stated. In other words, a phrase "based on" means both "based on only" and "based on at least."

Any reference to an element using a designation such as "first," "second," or the like used in the present disclosure does not generally restrict quantities or an order of those elements. Such designations can be used in the present disclosure as a convenient method of distinguishing two or more elements. Thus, reference to the first and second elements does not mean that only two elements can be adopted there, or the first element must precede the second element in a certain form.

Further, "means" in the configuration of each of the above devices may be replaced with "unit," "circuit," "device," or the like.

In a case in which "include," "including," and variations thereof are used in the present disclosure, these terms are intended to be comprehensive, similarly to a term "equipped with (comprising)." Further, the term "or" used in the present disclosure is intended not to be an exclusive disjunction.

A radio frame may include one or more frames in the time domain. In the time domain, each of one or more frames may be referred to as a sub frame. The sub frame may further include one or more slots in the time domain. The sub frame may have a fixed time length (for example, 1 ms) not depending on numerology.

The numerology may be a communication parameter applied to at least one of transmission and reception of a certain signal or channel. For example, the numerology may indicate at least one of a sub carrier spacing (SCS), a bandwidth, a symbol length, a cyclic prefix length, a transmission time interval (TTI), a number of symbols per TTI, a radio frame configuration, a specific filtering process performed in the frequency domain by a transceiver, a specific windowing process performed in the time domain by a transceiver, and the like.

The slot may include one or more symbols (orthogonal frequency division multiplexing (OFDM) symbols, single carrier frequency division multiple access (SC-FDMA) symbols, or the like) in the time domain. The slot may be a time unit based on the numerology.

The slot may include a plurality of mini slots. Each mini slot may include one or more symbols in the time domain. Further, the mini slot may be referred to as a sub-slot. The mini slot may include fewer symbols than a slot. A PDSCH (or PUSCH) transmitted in units of times greater than the mini slot may be referred to as a PDSCH (or PUSCH) mapping type A. A PDSCH (or PUSCH) transmitted using a mini slot may be referred to as a PDSCH (or PUSCH) mapping type B.

All of a radio frame, a sub frame, a slot, a mini slot, and a symbol indicates a time unit for transmitting a signal. As a radio frame, a sub frame, a slot, a mini slot, and a symbol, different designations respectively corresponding to them may be used.

For example, one sub frame may be referred to as a transmission time interval (TTI: Transmission Time Interval), or a plurality of consecutive sub frames may be referred to as TTIs, or one slot or one mini slot may be referred to as a TTI. In other words, at least one of the sub frame and the TTI may be a sub frame (1 ms) in the existing LTE, may be a period shorter than 1 ms (for example, 1 to 13 symbols), or may be referred to as a period longer than 1 ms. A unit representing the TTI may be referred to as slot, a mini slot, or the like instead of the sub frame.

Here, for example, the TTI refers to a minimum time unit of scheduling in wireless communication. For example, in the LTE system, the base station performs scheduling of allocating a radio resource (a frequency bandwidth, a transmission power, or the like which can be used in each user equipment 20) to each user equipment 20 in units of TTIs. The definition of the TTI is not limited thereto.

The TTI may be a transmission time unit such as a channel coded data packet (transport block), a code block, or a code word, or may be a processing unit such as scheduling or link adaptation. Further, when a TTI is given, a time interval (for example, the number of symbols) in which a transport block, a code block, a code word, or the like is actually mapped may be shorter than the TTI.

Further, when one slot or one mini slot is referred to as a TTI, one or more TTIs (that is, one or more slots or one or more mini slots) may be a minimum time unit of scheduling. Further, the number of slots (the number of mini slots) constituting the minimum time unit of scheduling may be controlled.

A TTI having a time length of 1 ms may be referred to as a common TTI (TTI in LTE Rel. 8 to 12), a normal TTI, a long TTI, a common sub frame, a normal sub frame, a long sub frame, a slot, or the like. A TTI shorter than the common TTI may be referred to as a reduced TTI, a short TTI, a partial TTI (a partial or fractional TTI), a reduced sub frame, a short sub frame, a mini slot, a sub slot, a slot, or the like.

Further, a long TTI (for example, a common TTI, a sub frame, or the like) may be replaced with a TTI having a time length exceeding 1 ms, and a short TTI (for example, a reduced TTI or the like) may be replaced with a TTI having a TTI length which is less than a TTI length of a long TTI and equal to or more than 1 ms.

The resource block (RB) is a resource allocation unit in the time domain and the frequency domain and may include one or more consecutive subcarriers in the frequency domain. The number of sub carriers included in an RB may be the same irrespective of a numerology and may be, for example, 12. The number of sub carriers included in an RB may be determined based on a numerology.

Further, a time domain of an RB may include one or more symbols and may be a length of one slot, one mini slot, one sub frame, or one TTI. Each of one TTI, one sub frame, or the like may be constituted by one or more resource blocks.

Further, one or more RBs may be referred to as a physical resource block (PRB), a sub carrier group (SCG), a resource element group (REG), a PRB pair, a RB pair, or the like.

Further, the resource block may be constituted by one or more resource elements (RE). For example, one RE may be a radio resource region of one subcarrier and one symbol.

A bandwidth part (BWP) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and it may not be assumed that the UE transmits and receives a predetermined signal/channel outside an active BWP. Further, a "cell," a "carrier," or the like in the present disclosure may be replaced with a "BWP."

Structures of the radio frame, the sub frame, slot, the mini slot, and the symbol are merely examples. For example, configurations such as the number of sub frames included in a radio frame, the number of slots per sub frame or radio frame, the number of mini slots included in a slot, the number of symbols and RBs included in a slot or a mini slot, the number of sub carriers included in an RB, the number of symbols in a TTI, a symbol length, a cyclic prefix (CP) length, and the like can be variously changed.

In the entire present disclosure, for example, when an article such as "a," "an," or "the" in English is added by a translation, the present disclosure may include a case in which a noun following the article is the plural.

In the present disclosure, a term "A and B are different" may mean "A and B are different from each other." Further, the term may mean "each of A and B is different from C." Terms such as "separated," "coupled," or the like may also be interpreted in similarly to "different."

Each aspect/embodiment described in this specification may be used alone, in combination, or may be switched in accordance with the execution. Further, notification of predetermined information (for example, notification of "being X") is not limited to being performed explicitly, but is performed by implicit (for example, not notifying the predetermined information) It is also good.

Although the present disclosure has been described above in detail, it is obvious to those skilled in the art that the present disclosure is not limited to the embodiments described in the present disclosure. The present disclosure may be implemented as revised and modified forms without departing from the gist and scope of the present disclosure as configured forth in claims. Therefore, the description of the present disclosure is for the purpose of illustration and does not have any restrictive meaning to the present disclosure.

LIST OF REFERENCE SYMBOLS

10 BASE STATION DEVICE
110 TRANSMITTING UNIT
120 RECEIVING UNIT
130 SETTING UNIT
140 CONTROL UNIT
20 USER EQUIPMENT
210 TRANSMITTING UNIT
220 RECEIVING UNIT
230 SETTING UNIT
240 CONTROL UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal comprising:
a processor that selects a first operation to determine a resource to be used for a transmission based on scheduling information received from a first terminal or a second operation to autonomously determine a resource to be used for a transmission and that executes the first operation or the second operation that is selected; and
a transmitter that transmits a message to the first terminal or a second terminal by using the resource determined by the processor in the first operation or the second operation,
wherein the processor is configured to assign a first degree of scheduling priority to the first operation and a second degree of scheduling priority to the second operation,
wherein the first degree of scheduling priority has a higher priority than the second degree of scheduling priority and the processor assigns the higher priority to the first operation to determine the resource based on the scheduling information than the second operation to autonomously determine the resource,
wherein the autonomously determining the resource includes autonomously sensing the resource, and
wherein the terminal is configured as a header terminal of a semi-distributed Media Access Control (MAC) wireless communication system.

2. The terminal according to claim 1,
wherein the processor determines whether the first operation or the second operation is allowed in a resource pool,
wherein, upon determining that the first operation is allowed in the resource pool, the processor selects and executes the first operation, and
wherein, upon determining that the second operation is allowed in the resource pool, the processor selects and executes the second operation.

3. The terminal according to claim 1,
wherein the processor determines that the first operation and the second operation is allowed in a resource pool, and
wherein, upon executing the second operation, the processor executes a predetermined operation related to the first operation.

4. The terminal according to claim 3, wherein the predetermined operation is to attempt to receive information related to the first operation to be transmitted from the first terminal and to avoid selecting a resource indicated by the scheduling information upon receiving the information related to the first operation.

5. The terminal according to claim 1, wherein the processor selects the first operation or the second operation based on a predetermined condition.

6. The terminal according to claim 5, wherein the predetermined condition is in response to a scheduling command being not received until a predetermined time period elapses after the transmitter transmits a scheduling request, or in response to a period during which the scheduling command is not received exceeds a predetermined threshold value based on a latency requirement.

* * * * *